United States Patent [19]

McCaghren

[11] Patent Number: 4,845,597

[45] Date of Patent: Jul. 4, 1989

[54] QUICK RELEASE LIGHT FIXTURE

[76] Inventor: Joel L. McCaghren, 123 Rivermont Bend, South, Somerville, Ala. 35670

[21] Appl. No.: 940,443

[22] Filed: Dec. 11, 1986

[51] Int. Cl.[4] B60Q 1/00

[52] U.S. Cl. 362/61; 362/368; 114/218

[58] Field of Search 362/61, 368, 253, 309, 362/390; 248/224.3, 539, 523, 231.9, 309.2, 314; 403/361, 372, 282; 114/218, 364

[56] References Cited

U.S. PATENT DOCUMENTS

| | | | |
|---|---|---|---|
| 2,297,916 | 10/1942 | Saver | 362/431 |
| 2,938,109 | 5/1960 | Coleman | 340/87 |
| 2,999,149 | 9/1961 | Cook, Jr. | 362/253 |
| 3,064,122 | 11/1962 | Reeder, Jr. | 362/61 |
| 3,065,003 | 11/1962 | Whitehouse | 114/218 X |
| 3,253,136 | 5/1966 | Faul | 362/413 |
| 3,517,184 | 6/1970 | Norton et al. | 362/61 |
| 3,671,001 | 6/1972 | Hall, Sr. | 248/539 |
| 3,752,108 | 8/1973 | Bovenzi | 362/61 X |
| 3,830,008 | 8/1974 | Johnson | 403/361 X |
| 3,833,800 | 9/1974 | Stewart et al. | 362/61 |
| 4,062,299 | 12/1977 | Smith | 114/364 X |
| 4,081,165 | 3/1978 | Fentress | 248/205.1 |
| 4,238,108 | 12/1980 | Muetterties | 24/115 L X |
| 4,627,374 | 12/1986 | Wright | 114/218 |
| 4,687,168 | 8/1987 | Rupp | 248/539 |

FOREIGN PATENT DOCUMENTS

| | | | |
|---|---|---|---|
| 587098 | 4/1947 | United Kingdom | 114/218 |

*Primary Examiner*—Ira S. Lazarus

*Assistant Examiner*—Richard R. Cole

*Attorney, Agent, or Firm*—George J. Porter

[57] ABSTRACT

A removable light and receptacle for use on a boat is disclosed. The light housing (12) which supports fluorescent bulbs (30) (32) is removably attached to the receptacle (38) by means of tapered pin (34) which is rotated and pressed into holes (36) (37) of receptacle (38) which in turn is adapted to be attached to the gunwale of a boat. The mating surfaces of the pin (34) and the receptacle holes (36) (37) are formed of a high strength material such as ABS plastic and are critically dimensioned to utilize the adhesion characteristics of the material to maintain a strong connection between the light housing (12) and its receptacle (38).

5 Claims, 2 Drawing Sheets

QUICK RELEASE LIGHT FIXTURE

TECHNICAL FIELD

This invention relates in general to a light fixture for convenient mounting, dismounting, and rotation, and in particular to a light fixture which is well suited for use on a boat.

BACKGROUND OF THE INVENTION

It has long been a problem to provide an effective night light for use by fishermen occupying small low-profile fishing boats, in particular boats commonly referred to as "bass boats."

Bass boats are typically constructed with very low sides. To accommodate occupants while fishing, a bass boat is normally provided with pivotal, pedestal-supported seats. The pedestals are mounted upon platforms formed near the upper portions of the boat sides commonly referred to as gunwales. Because of the low profile construction used in bass boats, the fisherman seated in the fishing seat is positioned well above the gunwales of the boat.

Thus it will be seen that when fishing at night from a bass boat, lights mounted in the sidewalls of the boat would effectively illuminate only the area below the gunwales of the boat. It is therefore necessary to provide an auxiliary lighting fixture capable of illuminating the area above the gunwales of the boat in order to illuminate the equipment being used by the fisherman. Such lighting is necessary to enable the fisherman to change lures or perform other necessary functions upon his equipment, while remaining in his seat. To be effective an auxiliary light must be rotatable so as to direct the light to the needed area and must be quickly and easily movable from one side of the boat to the other, or to alternate positions within the boat. A further requirement of such an auxiliary light is that it be firmly mounted to the boat so as to remain in place while the boat is underway at high speeds in water which is often quite rough.

Many attempts have been made to provide an effective auxiliary light to meet the needs of the night fisherman. For example, lights of this type have been marketed which bolt directly to the gunwales or walls of the boat. While such a mounting method is capable of holding the lights in place while the boat is underway, it is obvious that they cannot be easily moved from one location in the boat to another. Other mounting means have been tried, the most common being the use of suction cups. The suction cups are typically attached rigidly to the light fixture and are adapted to be removably stuck to the gunwales or sides of the boat. However, the suction cups have not proven to be effective since they are not easily moved nor are they capable of holding an auxiliary light in place under the severe vibration experienced while the boat is underway at high speeds in rough water.

In view of the foregoing discussion it will be apparent that existing bass boat auxiliary lighting systems do not provide a truly effective light which can be quickly redirected or moved, while fishing. Moreover, most prior art devices are not capable of remaining in place under the severe vibration conditions which often occur when underway at high speeds.

It is therefore the object of this invention to overcome the above mentioned shortcomings by providing a lighting system for a bass boat which may be quickly and easily directed and moved from one position to another within the boat, and is at the same time mounted so as to withstand the severe vibration often encountered in a boat of this type.

SUMMARY OF THE INVENTION

The present invention is a lighting system for low-profile, high speed fishing boats, commonly referred to as bass boats.

The invention comprises a rectangular light housing which is adapted to be mounted above gunwales of the boat so as to illuminate the area surrounding the occupants of the boat while fishing at night. The light housing is mounted with the unique combination of a closely dimensioned tapered pin which frictionally engages a closely dimensioned tapered hole within a receptacle mounted to the gunwale of the boat.

The dimensions of these items are critical in that the mounting must be extremely effective in order to hold the light rigidly in place while the boat is underway at high speeds in rough water. In addition to the requirement for rigid mounting of the light it must be quickly and easily movable to receptacles located at various convenient stations on the boat. These features are made possible by the use of acrylonitrite-butadiene-styrene resins, commonly referred to as ABS, for the contact surfaces between the tapered pin and the tapered hole within the receptacle which receives the pin. Thus the critical dimensions incorporated in this invention permit maximum utilization of the properties of ABS to achieve the features required when the light is inserted into its receptacle with a twisting and pressing motion. Conversely the light must be rotated and simultaneously pulled to remove it from its receptacle. Thus because of the dimensioning and the properties of ABS, the light cannot normally be securely mounted or removed without the application of a rotational as well as a vertical force.

DETAILED DESCRIPTION OF THE INVENTION

Figure 1:
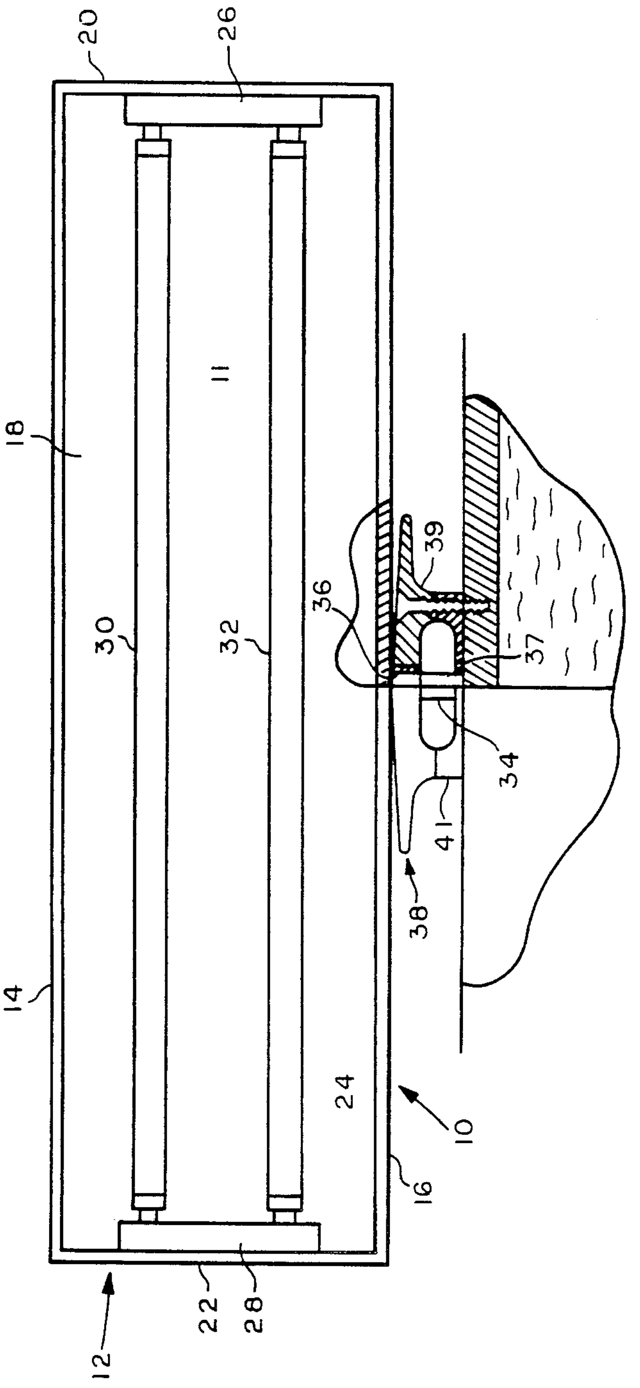
FIG. 1 is an elevational view of the movable light and its mounting pin with the portions thereof broken away to more clearly illustrate the construction of the device.

The invention shown generally by numeral 10 in FIG. 1 was developed because of a need for a rigidly mounted and easily movable lighting system for illumination of the fishing area of a bass boat.

As shown in FIG. 1 a light housing 12 consists of an upper portion 14, a lower portion 16, a reflective back portion 18, and side walls 20 and 22 all of which combine to provide a five sided rectangular box having an open face 24 in the forward portion thereof.

A pair of insulated electrical connectors 26, 28 are attached to the inside surfaces of side walls 20 and 22. The connectors 26, 28 serve to mount a pair of fluorescent bulbs 30, 32 which is powered by an electrical source (not shown) which may be contained within the back portion 11 of housing 12 or from an external electrical source.

The housing 12 is provided with a circular tapered mounting pin 34 attached to the lower portion 16 thereof. As shown, the mounting pin 34, which has a generally frusto conical shape, is an integral part of the housing 12; however, the pin could be provided separately and attached in any suitable manner. In the illustrated configuration the entire housing 12 and the tapered mounting pin 34 are formed of acrylonitrite-butadiene-styrene resins. As previously mentioned this resin blend forms an extremely strong and durable plastic commonly referred to as ABS. This material provides the needed strength and durability needed for such a lighting and mounting system. Additionally, as will be pointed out later in this specification, it possesses critical properties of compression and adhesion which make possible the unique mounting system employed in this lighting system.

As shown in FIG. 1 the tapered mounting pin 34 is designed to be inserted into receiver holes 36, and 37 formed in receptacle 38 which as shown serves the dual function of providing a mounting receptacle when the light system is in use, and a boat cleat when the lighting system is not in use. It will be noted that the upper one-half 39 of cleat 38 is metal while the lower one-half 41 is formed of ABS.

Figure 2:
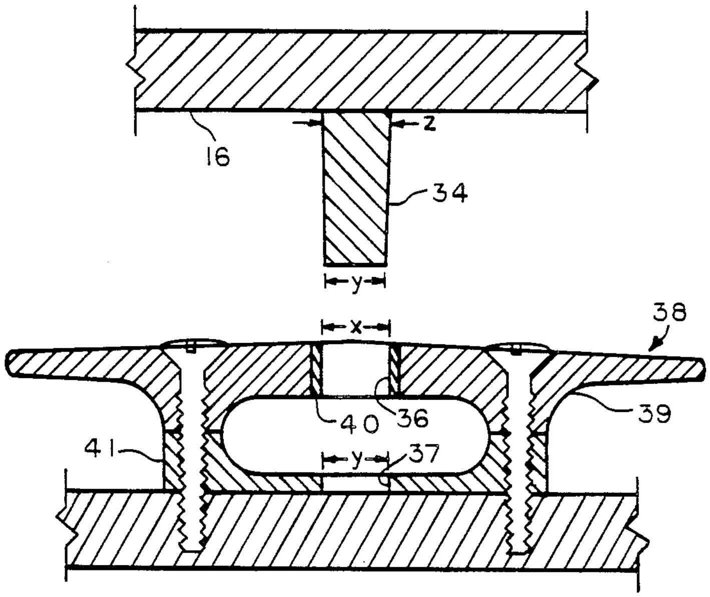
FIG. 2 is an enlarged elevational view of the mounting pin of the light and a cleat type receptacle mounted to the gunwale of a boat.
Figure 3:
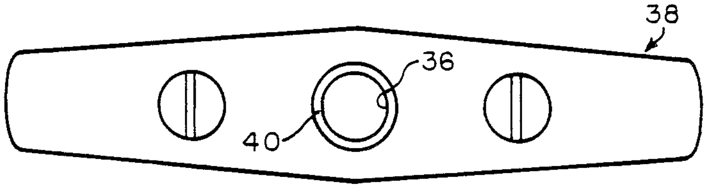
FIG. 3 is a top view of a cleat type mounting receptacle.

The unique and critical aspects of this mounting means are most clearly illustrated in FIG. 2 wherein the dimensions and arrangements of the elements are disclosed in detail. Thus, it will be seen that the hole 40, in the upper half 39 of cleat 38 is lined with ABS so as to form a sleeve which defines a receiver hole 36. As previously stated the lower half 41 of cleat 38 is totally formed of ABS, thus providing a receiver hole 37 having an inner surface also of ABS.

It has been discovered that use of ABS in the formation of the pin 34 and the inner surface of receiver holes 36 and 37 can create an extremely great adhesion of the pin 34 to the receiver hole surfaces when the taper and dimensions of these mating items are maintained within certain limits. Thus to achieve maximum utilization of the unique adhesion properties of the ABS material the ideal taper relationship between pin 34 and its receiver holes 36, 37 must be such that the lower ends of pin 34 and hole 37 have the same diameter "y" as illustrated in FIG. 2 while the diameter "z" of the upper end of pin 34 is 0.003" larger than diameter "x" of the upper end of hole 36. Stated another way the diameter "z" is equal to "z" or "y" plus 0.003". To maintain adequate adhesion between the pin and its receiver holes the ideal dimensional relationships as stated must be maintained within plus or minus 0.005". Thus the pin 34 or its receiver or both may have a generally frusto conical configuration. For example, the upper and lower diameter "x" and "y" of the receiver holes 36, 37 could be equal so as to provide a straight line or nontapered hole, in which case the dimensional requirements as set forth above would dictate the taper of the pin 34. In such an example the "x" and "y" dimensions would be equal and the upper pin diameter "z" by virtue of a straight line taper would be 0.003" larger than the diameters "x" and "y." Thus it will be seen that the compression forces and thus the compression of the ABS material increases from the lower to the upper ends of the pin and the receiver.

Typically the length of pin 34 is about one inch, and its diameter is about ½ inch. However, reasonable variations of the pin length or diameter will not effect the pin adhesion provided the dimension and tolerance limitations as set forth above are maintained. Thus a typical one inch long pin when dimensioned as in the example above would have an inward and downward taper of 0.003" plus or minus 0.0005" per inch of pin length, or stated another way a taper of 0.0025" to 0.0035" per inch of pin length.

Figure 4:
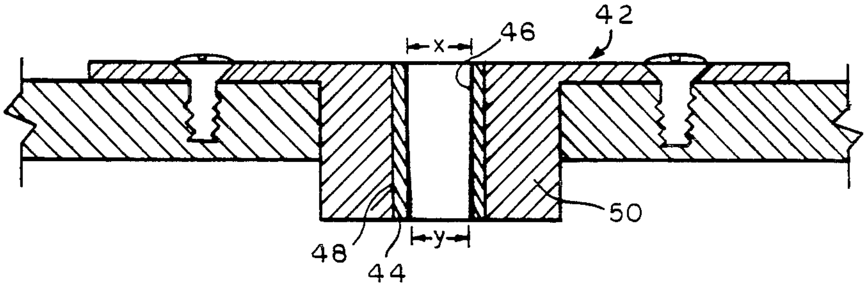
FIG. 4 is an elevational view of an alternate receptacle mounted in the gunwale of a boat.

An alternate receptacle 42 is illustrated in FIG. 4. This receptacle utilizes a single receiver hole 46 which is defined by an ABS liner 44 which may be press fitted or molded into a larger hole 48 formed in the body 50 of receptacle 42. The body of the receptacle may be made of any suitable material or the entire receptacle could be made of ABS. The diameters "x" and "y" at the upper and lower ends of hole 46 must of course bear the same relationship to the diameters "z" and "y" of pin 34 as was described earlier in the specification.

While the invention is shown in but one form, it will be obvious to those skilled in the art that it is not so limited but is susceptible to various other changes and modifications without departing from the spirit thereof.

What is claimed:

1. A lighting system for mounting on the gunwale of a boat comprising:

a housing having upper and lower portions and an open face;

a light means mounted within said housing and adapted to emit light though said open face;

a tapered pin having a frusto-conical friction contact surface, said pin being rigidly attached to the lower portion of said housing, said tapered pin having an upper end and a lower end, said pin tapering downward from said upper end to said lower end at the rate of 0.0025 to 0.0035 of one inch for each inch of length of said pin;

a receptacle adapted for mounting to the gunwale of said boat, said receptacle having a hole therein adapted to receive said tapered pin, said hole having a friction contact surface adapted to frictionally engage said frusto-conical friction contact surface of said tapered pin, said hole in said receptacle having upper and lower portions, said upper portion being 0.0025 to 0.0035 of an inch less in diameter than said upper end of said tapered pin, said lower portion of said tapered receptacle being substantially the same diameter as said lower end of said tapered pin whereby said pin is held firmly in place when forced into said hole in said tapered receptacle with a twisting motion, said contact surfaces of said tapered pin and said hole being formed of acrylonitrite-butadiene-styrene resins.

2. A lighting system for mounting on a boat comprising:

means for housing a light, said housing means having upper and lower portions;

a light attached to said housing means;

a frusto-conical tapered pin attached to said lower portion of said housing means, said tapered pin having a friction contact surface around its full circumference; and a receptacle adapted for mounting on said boat, said receptacle having a hole therein adapted to receive said tapered pin, said hole in said receptacle having a friction contact surface around its full circumference adapted to frictionally engage said friction contact surface of said tapered pin, said tapered pin and said hole in said receptacle both having an upper end and a lower end, the lower ends of saaid tapered pin and said hole in said receptacle both having substantially the same diameter, the upper end of said tapered pin having a diameter which is larger than the diameter of said upper end of said hole in said receptacle, said pin tapering inwardly from said upper end to said lower end at a rate of 0.0035" for each inch of length of said pin, the upper end of said tapered pin having a diameter which is between 0.0025" and 0.0035" larger than the diameter of said upper end of said hole in said receptacle, said contact surfaces of said tapered pin and in said hole being formed of acrylonitrite-butadiene-styrene resins;

whereby said larger upper end of said tapered pin is capable of being inserted into said upper end of said hole in said receptacle and twisted, whereby said friction contact surfaces on said tapered pin and in said hole in said receptacle will hold said tapered pin firmly in position.

3. A system for lighting the area above the gunwales of a bass boat comprising:

a housing for a boat light, said housing comprising an upper portionand a lower portion;

a light attached to said housing; and means for rotatably mounting said light housing on the gunwales of a bass boat, said means comprising:

a frusto-conical tapered pin attached to the lower portion of said housing, said tapered pin having a firctional contact surface around its full circumference; and a cleat adapted for mounting on the gunwale of a boat, said cleat having a hole bored down through its center for receiving said tapered pin, said cleat comprising a solid top portion and a solid bottom portion, said top and bottom portions being continuous at their ends and wherein there is an opening between the center parts of said top and bottom portions of said cleat, said hole bored through said solid top portion of said cleat being slightly smaller in diameter than the diameter of the top portion of said tapered pin and said hole bored through said solid bottom portion of said cleat being the same diameter as the diameter of the bottom portion of said tapered pin, said lower portion of said cleat being made of ABS (acrylonitrite-butadiene-styrene) resins, the center of said upper portion of said cleat containing an ABS sleeve, the inside diameter of said sleeve defining said hole bored down through said top portion of said cleat;

whereby said tapered pin may be inserted into said hole bored down through said center of said cleat so as to make frictional contact with both said top portion and said bottom portion of said cleat.

4. The lighting system for a bass boat as set forth in claim 3 wherein said pin tapers inwardly from said upper end to said lower end of said pin at a rate of 0.0025" to 0.0035" for each inch of length of said pin and wherein said upper end of said tapered pin is oversize and closely-dimensioned in that it has a diameter which is between 0.0025" and 0.0035" larger than the diameter of said upper end of said hole through said upper portion os said cleat;

whereby the frictional engagement between said oversize, closely-dimensioned ABS tapered pin and said closely-dimensioned ABS tapered hole, cause said light and said housing to remain firmly in place when in use and while said boat is in transit, yet be easily rotatable and removable as desired.

5. A system for lighting the area above the gunwales of a bass boat comprising:

a housing for a boat light, said housing comprising an upper portion and a lower portion; said housing being configured to extend well above the gunwales of a bass boat;

a light attached to said housing, said light comprising at least one fluorescent tube, wherein said housing is rectangular to accommodate said tube; and means for rotatably mounting said light housing on the gunwales of a bass boat, said means comprising:

a frusto-conical tapered pin attached to the lower portion of said housing, said tapered pin having a frictional contact surface around its full circumference; and a cleat adapted for mounting on the gunwales of a boat, said cleat having a hole bored down through its center for receiving said tapered pin.

* * * * *